United States Patent

Kikly

[11] Patent Number: 5,794,326
[45] Date of Patent: Aug. 18, 1998

[54] REMOVAL OF END PLAY IN ELECTRIC MOTORS

[75] Inventor: Ned L. Kikly, Vandalia, Ohio

[73] Assignee: ITT Automotive Electrical Systems, Inc., Auburn Hills, Mich.

[21] Appl. No.: 772,069

[22] Filed: Dec. 19, 1996

[51] Int. Cl.$^6$ .................................................. H02K 15/14
[52] U.S. Cl. .............................. 29/596; 29/598; 310/42; 310/43; 310/90
[58] Field of Search ................ 29/596, 598; 310/42, 310/43, 90

[56] References Cited

U.S. PATENT DOCUMENTS

| | | | |
|---|---|---|---|
| Re. 34,667 | 7/1994 | Neumann | 310/216 |
| 2,975,649 | 3/1961 | Propst | 74/424.8 |
| 3,068,713 | 12/1962 | Davis | 74/424.8 |
| 3,068,714 | 12/1962 | Davis | 74/459 |
| 3,302,477 | 2/1967 | Grabowski | 74/424.8 |
| 3,333,484 | 8/1967 | Young | 74/424.8 |
| 3,452,226 | 6/1969 | Hettich | 310/50 |
| 3,476,966 | 11/1969 | Willyoung | 310/270 |
| 3,707,038 | 12/1972 | Hallerback | 29/596 |
| 3,855,486 | 12/1974 | Binder et al. | 310/49 |
| 3,894,256 | 7/1975 | Sholtz | 310/90 |
| 3,937,097 | 2/1976 | Fund et al. | 74/424.8 |
| 3,952,406 | 4/1976 | Madseon | 29/598 |
| 4,031,610 | 6/1977 | Singh et al. | 29/598 |
| 4,258,584 | 3/1981 | Haegele et al. | 74/424.8 |
| 4,400,639 | 8/1983 | Kobayashi et al. | 310/215 |
| 4,745,320 | 5/1988 | Oyama et al. | 310/217 |
| 4,780,632 | 10/1988 | Murray, III | 310/111 |
| 4,823,032 | 4/1989 | Ward et al. | 310/43 |
| 4,839,552 | 6/1989 | Takaba | 310/268 |
| 4,862,026 | 8/1989 | Riback | 310/90 |
| 4,868,436 | 9/1989 | Attilio et al. | 310/67 |
| 4,887,480 | 12/1989 | Pollo | 74/459 |
| 4,972,113 | 11/1990 | Newberg | 310/217 |
| 5,006,747 | 4/1991 | Stewart, Sr. | 310/239 |
| 5,008,572 | 4/1991 | Marshall et al. | 310/45 |
| 5,010,266 | 4/1991 | Uchida | 310/156 |
| 5,049,771 | 9/1991 | Challita et al. | 310/219 |
| 5,068,556 | 11/1991 | Lykes et al. | 310/90 |
| 5,073,735 | 12/1991 | Takagi | 310/71 |
| 5,087,847 | 2/1992 | Giesbert et al. | 310/90 |
| 5,088,362 | 2/1992 | Schalles | 82/142 |
| 5,113,114 | 5/1992 | Shih et al. | 310/270 |
| 5,128,571 | 7/1992 | Itsu | 310/67 |
| 5,296,773 | 3/1994 | El-Antably | 310/261 |
| 5,321,328 | 6/1994 | Ide | 310/90 |
| 5,357,160 | 10/1994 | Kaneda et al. | 310/67 |
| 5,394,043 | 2/1995 | Hsia | 310/90 |
| 5,485,044 | 1/1996 | Mackay et al. | 310/43 |

FOREIGN PATENT DOCUMENTS

| | | | |
|---|---|---|---|
| 0485001 | 5/1992 | European Pat. Off. | 35/67 |
| 1566801 | 4/1968 | France . | |
| 144553 | 8/1958 | Japan . | |
| 110464 | 9/1981 | Japan . | |
| 99741 | 5/1988 | Japan . | |

OTHER PUBLICATIONS

"Powermax II® Heybrid Step Motors", Pacific Scientific Motor & Control Division.

*Primary Examiner*—Carl E. Hall
*Attorney, Agent, or Firm*—J. Gordon Lewis; Thomas N. Twomey

[57] ABSTRACT

A system for removing end play in electric motors. A ball is placed near an end face of a shaft having end play. Pressurized fluid is applied to the ball, driving it into contact with the end face. The fluid solidifies, forming a solid body which supports the ball in its position of contact with the end face.

12 Claims, 7 Drawing Sheets

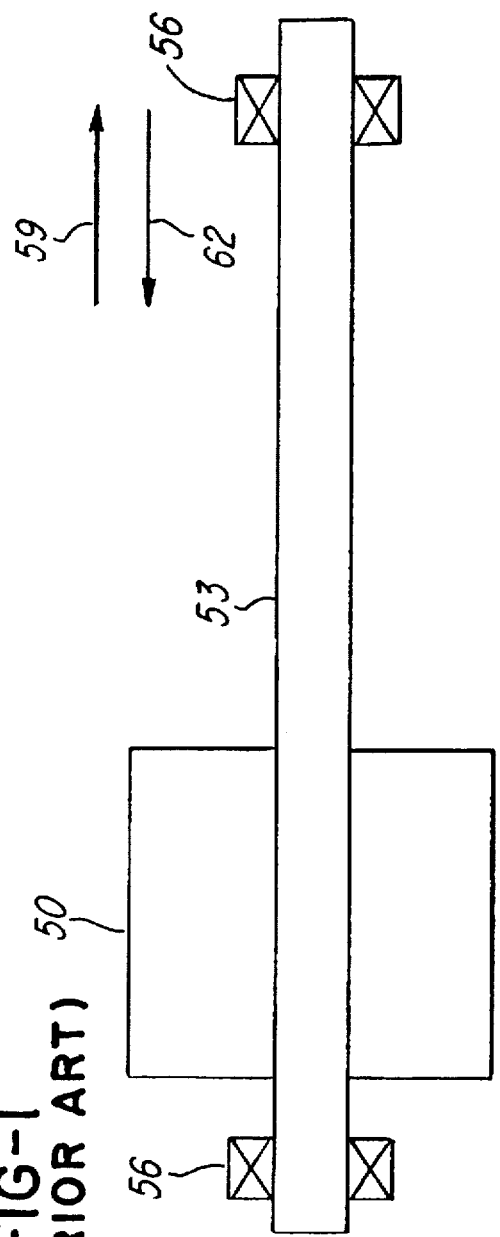
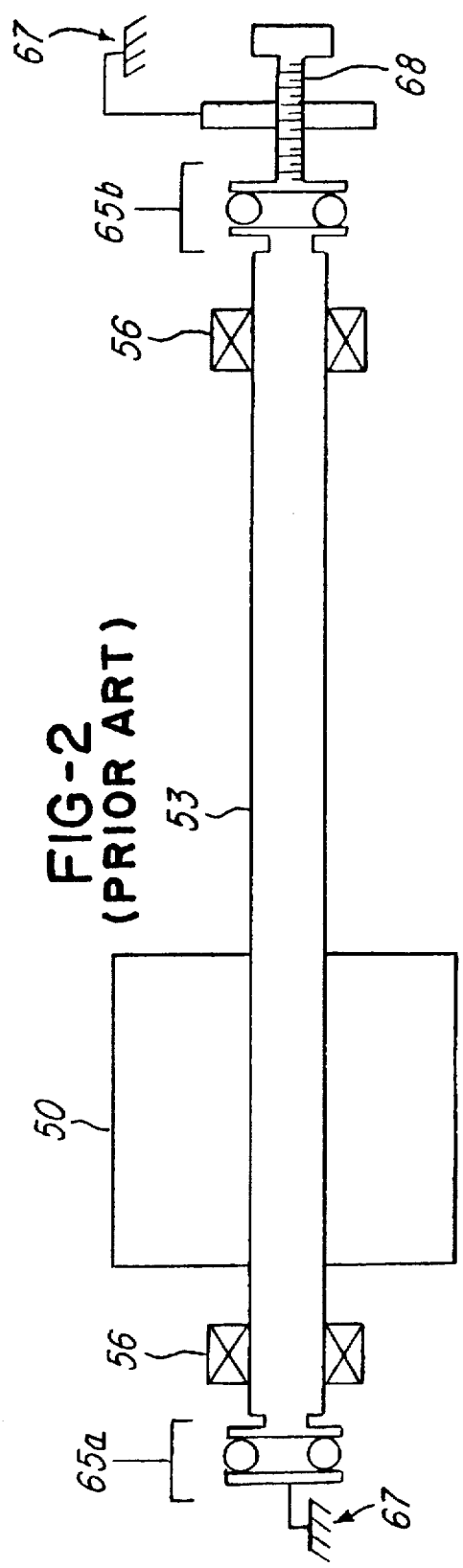

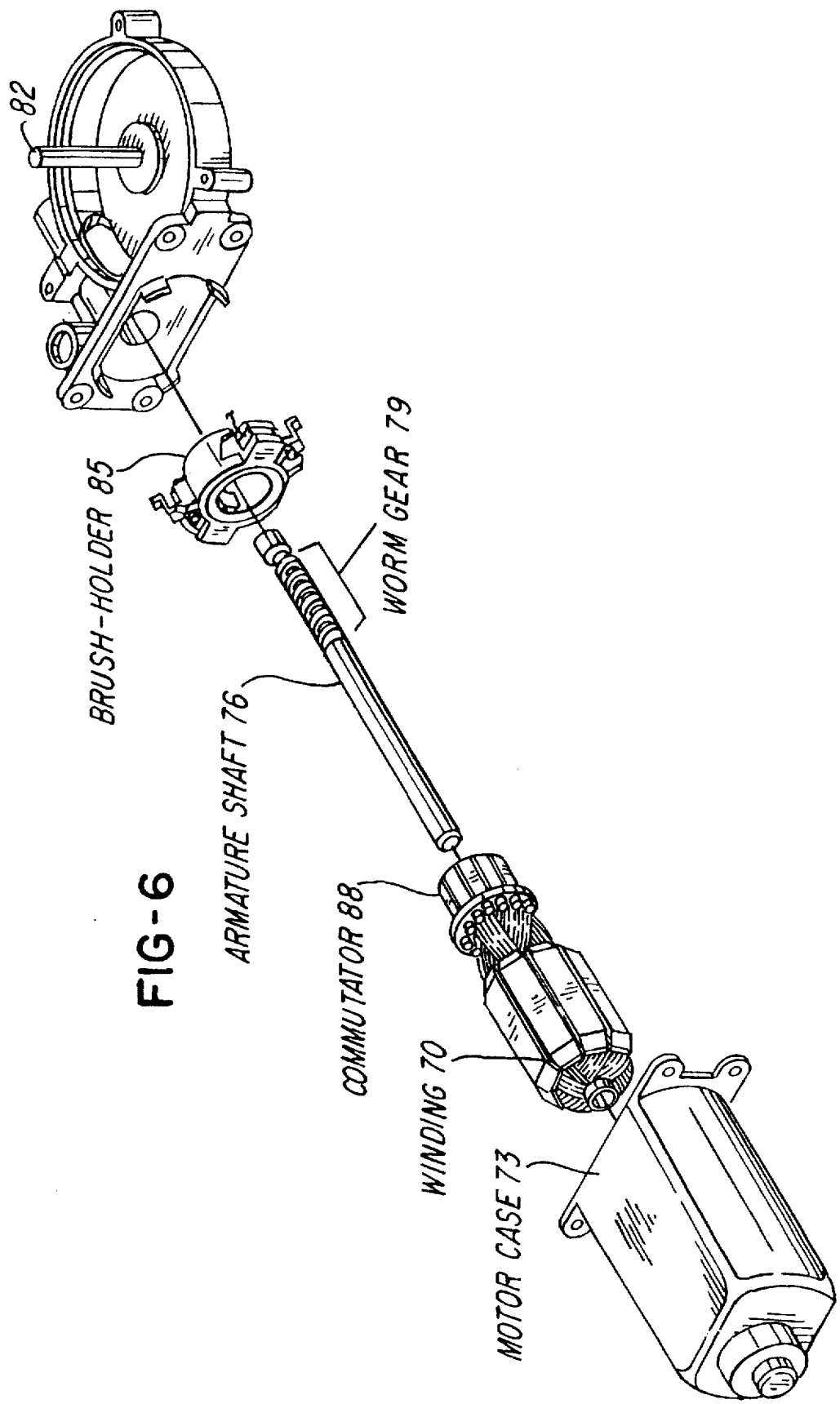

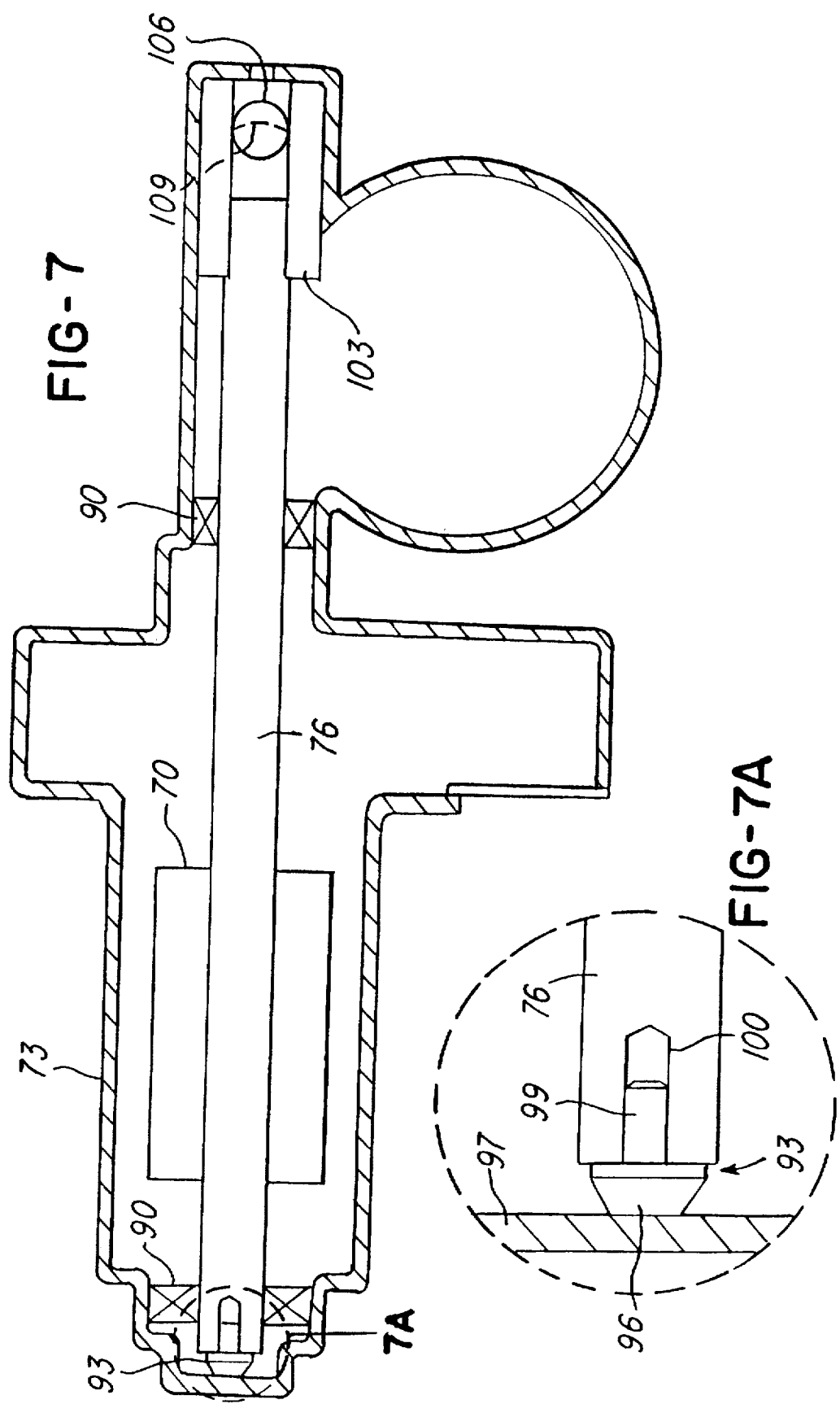

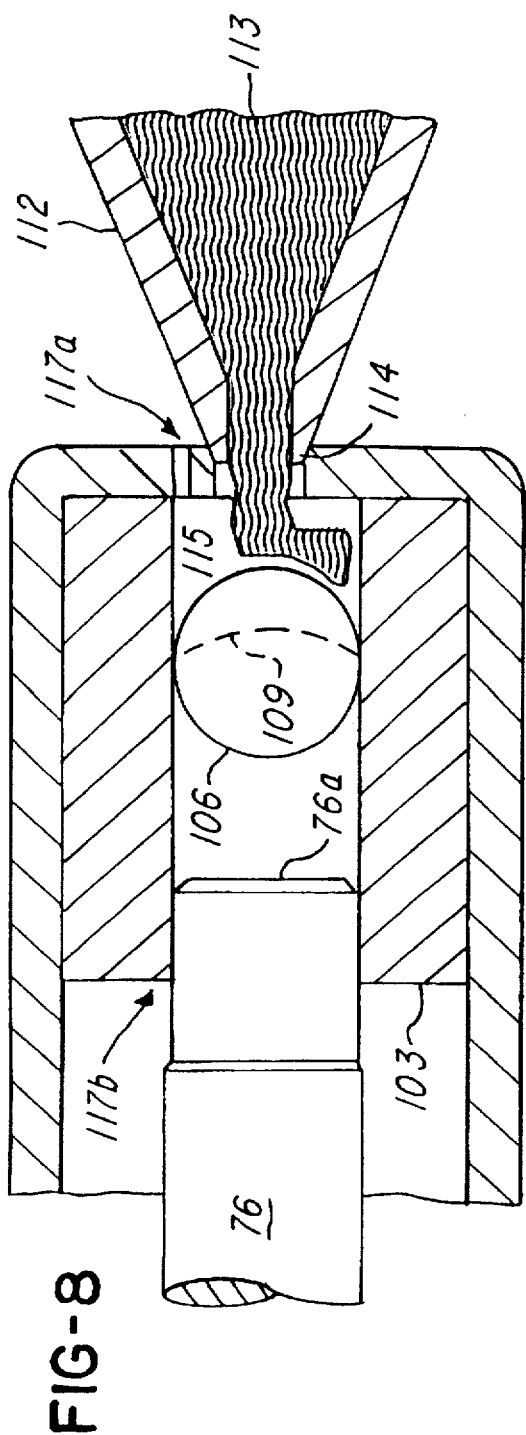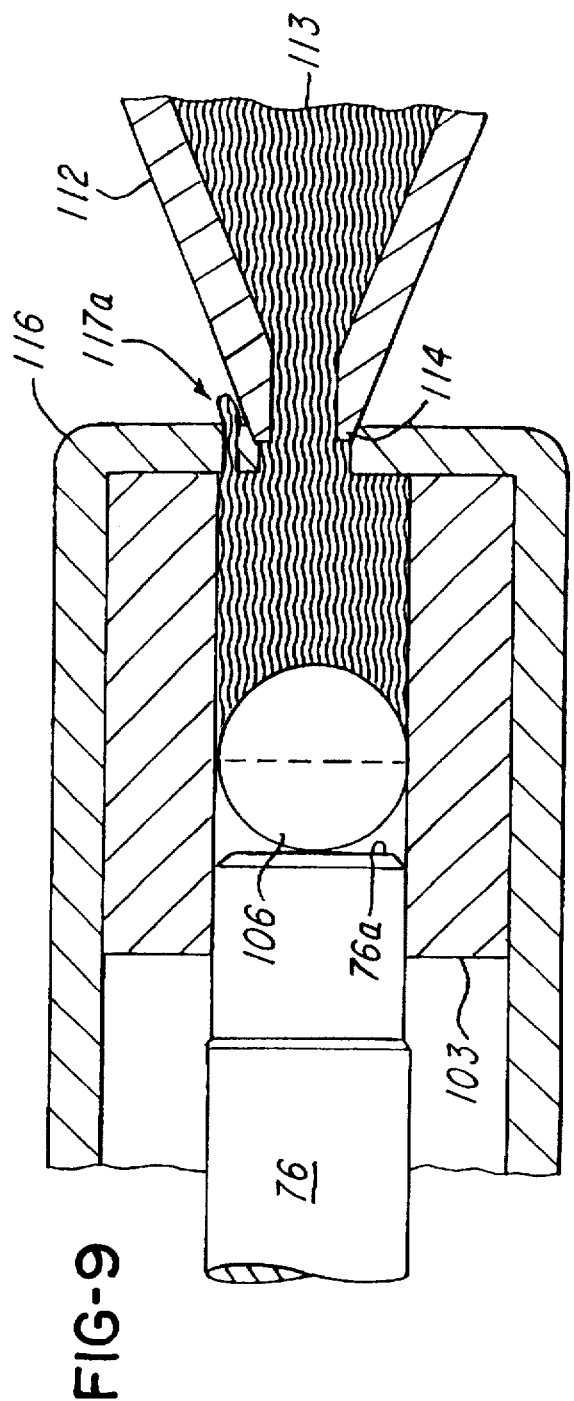

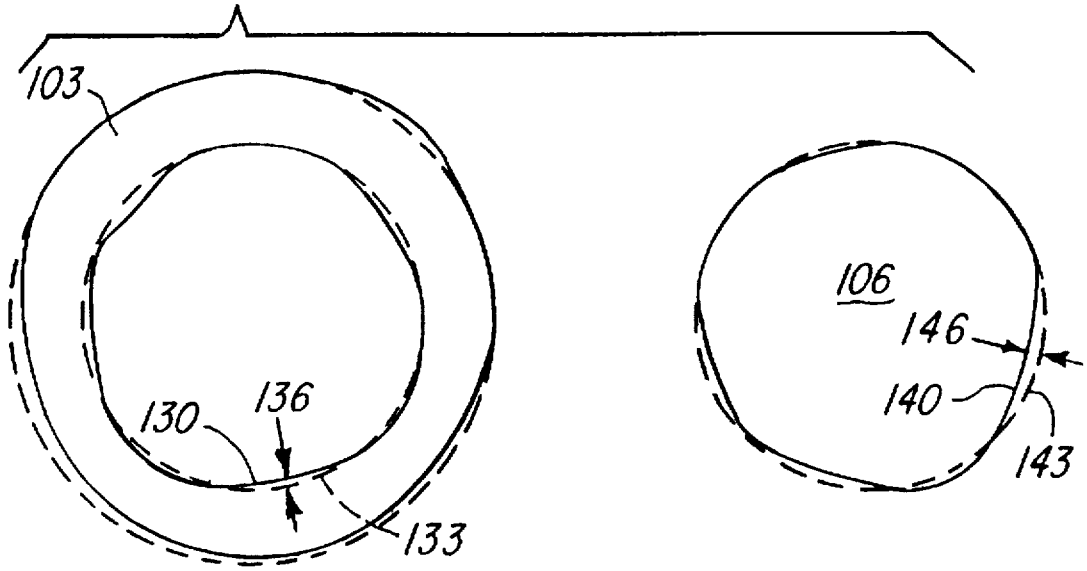
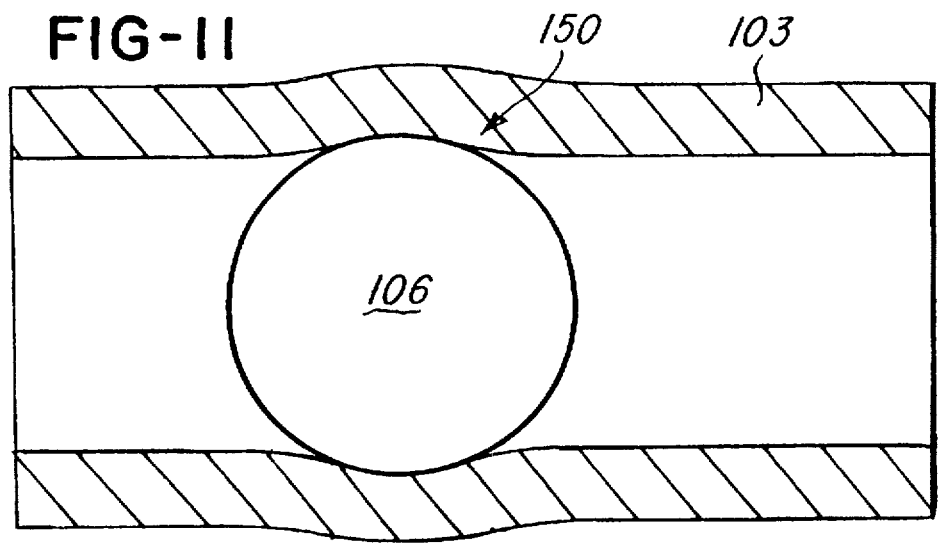

5,794,326

REMOVAL OF END PLAY IN ELECTRIC MOTORS

BACKGROUND OF THE INVENTION

1. Field of the Invention

The invention concerns suppression of unwanted longitudinal motion in shafts of electric motors.

2. Description of Related Art

FIG. 1 illustrates a schematic view of a rotor of an electric motor, wherein an armature 50 is supported by a shaft 53, which is, in turn, supported by bearings 56. The shaft 53 should be constrained against axial motion in directions 59 and 62. Such motion is commonly called end play.

Various expedients have been developed to minimize the end play, such as the two thrust bearings 65A and 65B shown schematically in FIG. 2. The ground symbols 67 indicate components which are fixed against motion. A jacking screw 68 adjusts the axial position of the thrust bearing 65B, thus allowing removal of the end play of the shaft 53.

However, in inexpensive motors, such as those used in electric windows in automotive applications, such thrust bearings represent an undesirable expensive approach to minimizing end play. A less expensive approach appears to be illustrated by FIG. 3, which is a representation of FIG. 2B of U.S. Pat. No. 5,213,000, in which the inventors are Saya, Nakahashi, Taniguchi, and Watanabe, which was issued on May 25, 1993, and which will be called the Saya patent.

In FIG. 3, a shaft 4 is supported by bearing 5 within a gear case 17. A bearing holder 22 supports the bearing 5, and, initially, is movable left and right. Bearing holder 22 also supports a ball bearing 9.

During manufacture, the bearing holder 22 is positioned such that ball bearing 9 abuts the shaft 4, and eliminates left-right motion of the shaft 4. At this time, an epoxy resin 10 is pumped through aperture 28. When the resin cures, ball bearing 9 becomes locked in the proper position, because the bearing holder 22 is now frozen within the solidified epoxy.

The approach of FIG. 3 is, perhaps, prone to positioning errors. For example, keeping the bearing holder 22 properly aligned within the gear case 17 prior to injection of the epoxy would appear to be difficult. That is, the desired orientation of the bearing holder is illustrated in FIG. 3A. However, it appears that nothing prevents the entire bearing holder 22 from rotating into the position indicated in FIG. 4 and becoming skewed within gear case 17 especially when the epoxy resin 10 is injected through aperture 28. With this skewing, the ball bearing 9 does not properly abut the shaft 4.

The inventors of the Saya patent appear to expect this skewing, because bearing 5 is drawn as a spherical bearing. That is, as shown in FIG. 5, surfaces S1 and S2 are curved, to accommodate the misalignment shown in the FIG. 3A.

The approach of the Saya patent also appears to be overly complex. The bearing holder 22 appears to be a complex part, which must be manufactured by machining or injection-molding. Further, the bearing holder 22 of FIG. 3 must be inserted into the gear casing 17 in the correct direction (with legs 29 facing wall 26), and with a precise alignment (with extensions 24 flush against the inner surface of the gear casing 17). Still further, some difficulty is expected in insertion of the bearing holder 22 into the gear casing 17, because extensions 24 act as seals and therefore, must engage the gear casing 17 with a tight fit.

SUMMARY OF THE INVENTION

An object of the invention is to provide an improved system for reducing end play in shafts.

A further object of the invention is to provide an improved system for reducing end play in electric motors used in automotive applications.

In one aspect, this invention comprises a process of assembling an electric motor having a shaft, comprising the following steps placing a ball near an end of a shaft in the electric motor and driving the ball into contact with the end face by applying pressurized fluid to the ball.

In another aspect, this invention comprises a process of removing end play in an electric motor, comprising the following steps supporting a sleeve bearing within a housing of the electric motor, such that a first opening of the sleeve bearing faces a wall of the housing, the wall bearing an aperture, placing a ball within the sleeve bearing, partially inserting a shaft into a second opening of the sleeve bearing, thereby trapping the ball between the shaft and the wall, injecting a fluid into the sleeve bearing, through the aperture to drive the ball into contact with an end of the shaft and allowing the fluid to solidify, thereby holding the ball against said end.

In another aspect, this invention comprises an electric motor containing a shaft having an end face, the improvement comprising a chamber adjacent to the end face, a ball, within the chamber, in contact with the end face and a substance, trapped within the chamber, which holds the ball against the end face.

In another form of the invention, a ball is placed near an end face of a shaft in an electric motor. A pressurized fluid is applied to the ball, driving the ball into contact with the end face. The fluid then solidifies, holding the ball against the end face.

Other objects and advantages of the invention will be apparent from the following description, the accompanying drawings, and the appended claims.

BRIEF DESCRIPTION OF THE DRAWINGS

FIG. 1 is a schematic of a rotor of an electric motor;

FIG. 2 illustrates a possible way of removing end play of shaft 53;

FIG. 6 is an exploded view of one form of the invention;

FIG. 7 is a simplified cross sectional view of the apparatus of FIG. 6 when assembled;

FIG. 7A is an exploded enlarged view of a portion of the apparatus shown in FIG. 7.

FIGS. 8 and 9 are an enlarged views of the right side of FIG. 7 and show injection of a resin 113;

FIG. 10 illustrates, in exaggerated form, how sleeve bearing 103 and ball 106 deviate from perfect circularity; and FIG. 11 illustrates ball 106 captured within a deformable sleeve 103.

DETAILED DESCRIPTION OF THE INVENTION

Figure 3:
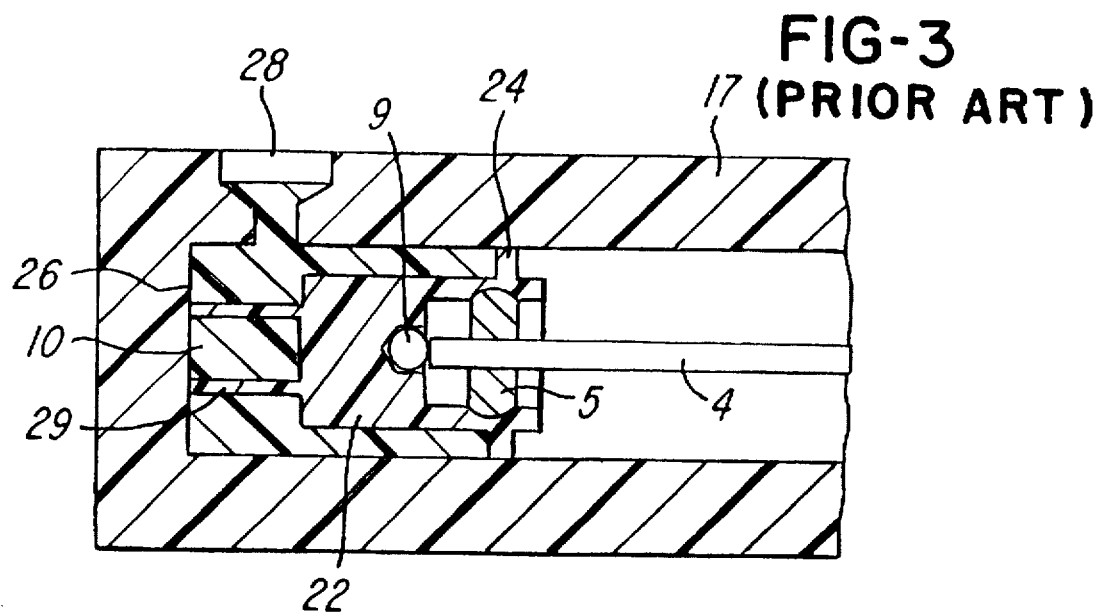
FIG. 3 is copy of a Figure of U.S. Pat. No. 5,213,000.
Figure 3A:
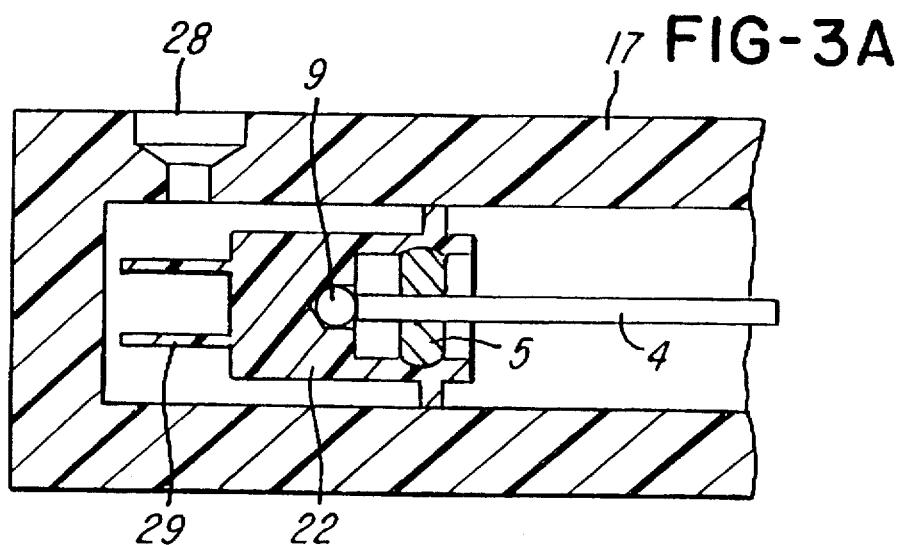
FIG. 3A is a simplification of FIG. 3.
Figure 4:
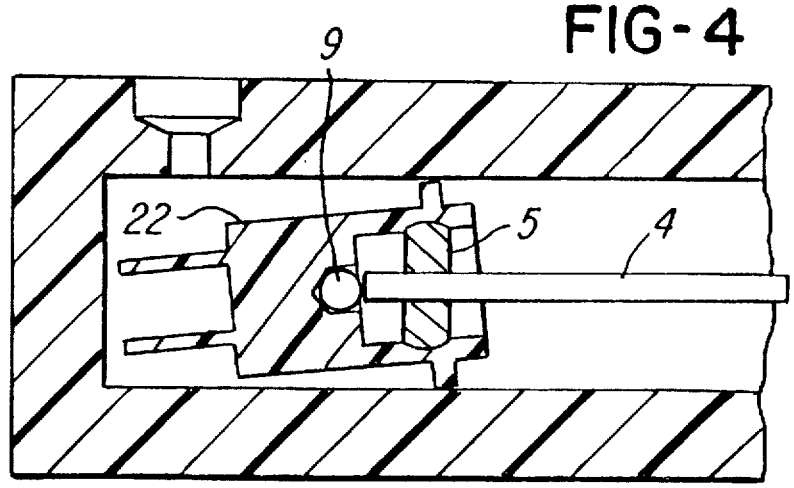
FIG. 4 illustrates how the bearing holder 22 of FIG. 3 can become skewed.
Figure 5:
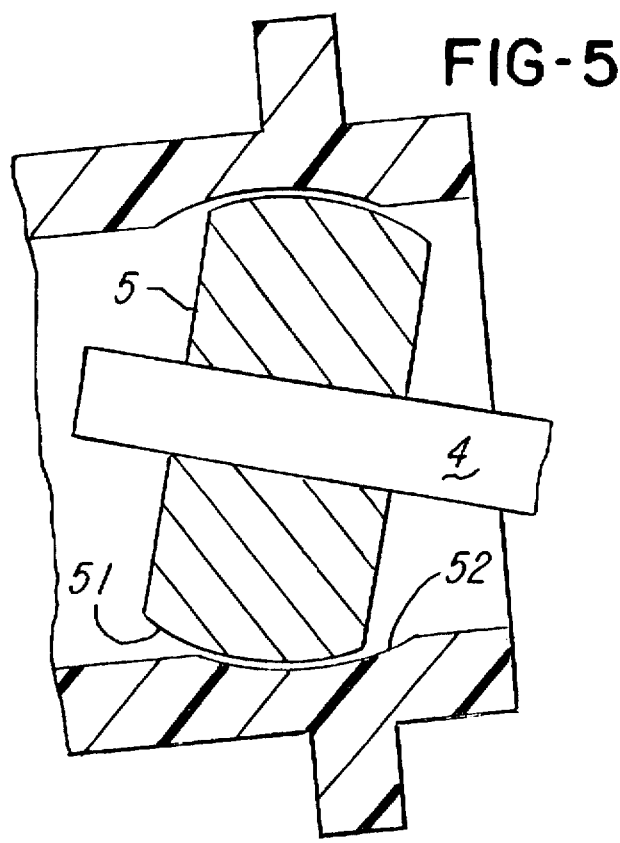
FIG. 5 illustrates how spherical bearing 5 of FIG. 3 moves to accommodate the skew of FIG. 4.

FIG. 6 is an exploded view of an electric motor used in powered windows in automotive vehicles. An winding 70 produces a magnetic field (not shown), which interacts with a magnetic field (not shown) produced by a stator (not shown), which is contained within motor case 73. The interaction between the magnetic fields causes the winding to rotate, as well as shaft 76, to which the winding 70 is affixed.

The shaft 76 bears a worm gear 79 which engages a spur gear (not shown) and which rides shaft 82. A brush assembly (not fully shown), held within a brush holder 85, contacts a commutator 88, to deliver electric current to the winding 70.

FIG. 7 is a simplified cross-sectional view of relevant components of FIG. 6. The shaft 76 (FIG. 7) is constrained against radial motion by suitable bearings or bushings, such as bearing 90. Axial motion in the leftward direction is prevented by a thrust plug 93 (FIG. 7A). As the insert shows, the head 96 of the thrust plug 93, rides against a wall 97 of the housing 93. A stem 99 of the thrust plug 93 fits into a concentric bore 100 of the shaft 76.

At end of the shaft 76 opposite to the thrust plug 93, the shaft is journaled into a sleeve bearing 103. The sleeve bearing 103 contains a thrust ball 106. The position of the thrust ball 106 is that occurring just prior to final manufacturing steps which will now be explained.

The thrust ball 106 forms a seal at its equator 109, where it contacts the sleeve bearing 103, because the diameter of the thrust ball 106 closely matches the inner diameter 110 of the sleeve bearing 103. The thrust ball 106 is free to move left-and-right as viewed in FIG. 7 within the sleeve bearing 103.

As FIG. 8 illustrates, an injector 112 injects an epoxy resin 113, through a hole 114, into a chamber 115 of which the thrust ball 103 forms one wall. Passage 117a allows escape of air which is displaced by the resin 113.

The pressure of the resin 113 drives the thrust ball 103 to the left (as viewed in FIG. 8) into contact with the end face 76a of shaft 76, as indicated in FIG. 9. Passage 117b defined between shaft 76 and sleeve bearing 103 allows escape of air displaced by the movement of ball 106. The injector continues to fill cavity until full and resin starts exiting hole 117A. The injector forms a seal around hole 114 to prevent resin from escaping during the filing process.

If desired, the entire assembly of FIG. 9 can be oriented so that the shaft 76 stands in a vertical position, so that hole 114 lies in a horizontal plane. The housing 116 can be chamfered to fit injector 112 point, no leakage of resin will occur at hole 114. When the resin 113 cures, the thrust ball 103 is permanently held in the position shown in FIG. 9.

The thrust ball 106 can be constructed of a hardened steel or bronze. The sleeve bearing 103 can be manufactured of a powdered metal. However, the sleeve bearing 103 may not be perfectly cylindrical, as indicated in exaggerated form in FIG. 10. Preferably, the inner wall 130 of the sleeve bearing 103 is as close to cylindrical as economically feasible and does not deviate from a perfect cylinder 133 by more than a tolerance of ±0.0005 inch, the tolerance being indicated by dimension 136.

Similarly, it is preferred that the outer surface 140 of the thrust ball 106, shown at the right of FIG. 10, be as close to spherical as economically feasible, and does not deviate from a perfect sphere 143 by more than a tolerance of ±0.0005 inch, the tolerance being indicated by dimension 146.

The preceding presupposes making a seal between the thrust ball 106 and the sleeve bearing 103 by a close-tolerance fit between thrust ball 106 which is rigid and made of steel, and the sleeve 103 comprises a softer material such as powdered metal or bronze. An alternate approach is to use a deformable sleeve 103, such as a nylon sleeve, and a larger diameter ball 106, as indicated in FIG. 11. In this approach, the ball 106 causes a bulge 150 within the sleeve 103, and is held captive within the sleeve 103.

If the sleeve were held vertically, the ball will not fall out, which can assist the manufacturing process. Nevertheless, the fit of the ball 106 within the nylon sleeve 103 is not so tight as to prevent motion under the influence of the pressurized resin 113 of FIG. 9.

Ordinarily, in applying adhesives to materials, it is desired that the materials be as clean as possible, so that the adhesive adheres to the materials themselves, rather than to debris attached to the materials. However, it is likely that the sleeve 103 is intentionally impregnated with lubricant during its manufacture, as the sleeve 103 may be a sintered body. Further, it is likely that the ball 106 will be contaminated by oil.

Nevertheless, these oils are not removed, prior to the injection step of FIGS. 8 and 9. One reason is that the sleeve requires lubrication during later operation. Another reason is that it is not strictly necessary for the resin 113 in FIG. 9 to adhere to the ball 106. If the bond between the ball 106 and the resin is broken, no harm will arise, even if the ball 106 is induced into rotation by the point-contact between itself and the shaft 76. Further, such induced rotation is considered highly unlikely, or significant, if it does occur.

From another point of view, the resin 113 in FIG. 8 is not used as an adhesive. It is used as a fluidic substance, which fills chamber 115, and then solidifies into a solid body. The geometries of the parts are such that, once solid, the resin 113 cannot escape the chamber 115, and forces the ball 106 into its intended position.

Resin 113 need not be an epoxy resin. Thermoplastic materials can be used, such as common hot-melt glue. Six examples of thermoplastic materials are: Cellulose Acetate Butyrate; Nylon 6, 6; poly-methyl methacrylate; polytetrafluoroethylene (Teflon); polystyrene; and acrylonitrile butadiene-styrene (ABS). Thermoplastics are carbon polymers.

In addition, the resin 113 can perhaps be replaced by a low-melting metal alloy, such as tin-lead solder or a brazing compound.

Since the ball 106 is spherical, it has point symmetry. Consequently, it can be placed into the sleeve 103 without regard to its angular position. That is, if the center of the ball 106 is placed at the origin of a spherical coordinate system, then a reference point, on the surface of the ball 106, can be located at any position, yet the ball 106 can still be inserted into the sleeve 103, and will function properly.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention which is defined in the appended claims.

What is claimed is:

1. A method of assembling an electric motor having a shaft, comprising the following steps:

a) placing a ball near an end face of the shaft in the electric motor; and b) driving the ball into contact with said end face of the shaft by applying a pressure to the ball by using a fluid material such that when said fluid material solidifies said ball is held against said end face, and said fluid material conforms in shape to said ball and wherein said fluid material is in direct contact with said ball when driving said ball into said contact.

2. The method according to claim 1, wherein said pressurized fluid comprises a carbon polymer.

3. The method according to claim 1, wherein said pressurized fluid comprises a thermoplastic.

4. The method according to claim 1, wherein said pressurized fluid comprises an epoxy resin.

5. The method according to claim 1, wherein said pressurized fluid solidifies after a curing time elapses.

6. A method of assembling an electric motor having a shaft, comprising the following steps:

a) placing an end of said shaft into one opening of a sleeve bearing;

b) placing a ball into said sleeve bearing; and c) inserting fluidic material into said sleeve bearing in an amount sufficient to drive the ball into contact with the shaft such that when said fluidic material solidifies said ball is held against said end face.

7. The method according to claim 6, wherein said fluidic material comprises a carbon polymer.

8. The method according to claim 6, wherein said fluidic material comprises a thermoplastic.

9. The method according to claim 6, wherein said fluidic material comprises an epoxy resin.

10. A process of removing end play in an electric motor, comprising the following steps:

a) supporting a sleeve bearing within a housing of the electric motor, such that a first opening of the sleeve bearing faces a wall of the housing, the wall bearing an aperture;

b) placing a ball within the sleeve bearing;

c) partially inserting a shaft into a second opening of the sleeve bearing, thereby trapping the ball between the shaft and the wall;

d) injecting a fluid into the sleeve bearing, through the aperture to drive the ball into contact with an end of the shaft; and e) allowing the fluid to solidify, thereby holding the ball against said end.

11. The process according to claim 10, wherein the fluid comprises a carbon polymer.

12. The process according to claim 10, wherein the sleeve bearing is capable of resisting a radial load of the shaft during normal operation of the motor.

\* \* \* \* \*